US010132391B2

(12) United States Patent
Duan et al.

(10) Patent No.: US 10,132,391 B2
(45) Date of Patent: Nov. 20, 2018

(54) CONTINUOUSLY VARIABLE TRANSMISSION

(71) Applicant: GM GLOBAL TECHNOLOGY OPERATIONS LLC, Detroit, MI (US)

(72) Inventors: Chengwu Duan, Shanghia (CN); Robert J. Gonzalez, Clarkston, MI (US); Farzad Samie, Franklin, MI (US); Yongsheng He, Sterling Heights, MI (US); Chunhao J. Lee, Troy, MI (US); David J. Cleary, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 187 days.

(21) Appl. No.: 15/303,781

(22) PCT Filed: Apr. 16, 2014

(86) PCT No.: PCT/CN2014/075492
§ 371 (c)(1),
(2) Date: Oct. 13, 2016

(87) PCT Pub. No.: WO2015/157940
PCT Pub. Date: Oct. 22, 2015

(65) Prior Publication Data
US 2017/0030436 A1    Feb. 2, 2017

(51) Int. Cl.
*F16H 9/18*    (2006.01)
*F16H 55/56*   (2006.01)
(Continued)

(52) U.S. Cl.
CPC ............. *F16H 9/18* (2013.01); *F16H 9/00* (2013.01); *F16H 9/24* (2013.01); *F16H 55/56* (2013.01)

(58) Field of Classification Search
CPC ..... F16H 9/24; F16H 9/00; F16H 9/18; F16H 55/56; F16H 55/30; F16G 5/18; F16G 13/04

See application file for complete search history.

(56) References Cited

U.S. PATENT DOCUMENTS 4,705,492 A * 11/1987 Hattori .................... F16H 55/56
                                                    474/49
4,781,660 A * 11/1988 Amataka .................. F16H 9/24
                                                    474/174

(Continued)

FOREIGN PATENT DOCUMENTS

| CN | 103216593 A | 7/2013 | |
|---|---|---|---|
| CN | 203051653 U | 7/2013 | |
| JP | S6182038 A * | 4/1986 | ............... F16G 5/16 |

*Primary Examiner* — Michael R Mansen
*Assistant Examiner* — Robert T Reese
(74) *Attorney, Agent, or Firm* — Quinn IP Law

(57) ABSTRACT

A continuously variable transmission includes a first pulley, a second pulley, and an endless rotatable device operatively interconnecting the first and second pulleys. The endless rotatable device includes a device body and a plurality of device teeth protruding from the device body. Each of the first and second pulleys includes a first sheave, a second sheave, and a pulley axle operatively coupled between the first sheave and the second sheave. The pulley axle defines a pulley center. The first sheave is movable relative to the second sheave along the pulley axle. Each of the first and second sheaves includes a sheave body and a plurality of sheave teeth protruding from the sheave body. The sheave teeth are annularly arranged around the pulley center. The sheave teeth are shaped to mate with the device teeth.

16 Claims, 2 Drawing Sheets

(51) Int. Cl.
   *F16H 9/00*     (2006.01)
   *F16H 9/24*     (2006.01)

(56) References Cited

U.S. PATENT DOCUMENTS

| | | | | |
|---|---|---|---|---|
| 4,790,799 | A * | 12/1988 | Sadler | F16G 3/02 474/201 |
| 4,898,567 | A * | 2/1990 | Tatara | F16G 5/18 474/174 |
| 6,379,275 | B1 * | 4/2002 | Serkh | F16G 5/16 474/100 |
| 7,648,435 | B2 * | 1/2010 | Ishida | F16G 5/16 106/36 |
| 9,028,350 | B2 * | 5/2015 | Cho | F16H 55/54 474/47 |
| 9,765,860 | B2 * | 9/2017 | Tange | F16H 9/24 |
| 2011/0053717 | A1 * | 3/2011 | Miura | F16H 9/18 474/46 |
| 2013/0090199 | A1 | 4/2013 | Itoo et al. | |
| 2016/0281847 | A1 * | 9/2016 | Kanayama | F16H 63/065 |
| 2017/0314676 | A1 * | 11/2017 | Huang | F16H 61/66272 |
| 2018/0080530 | A1 * | 3/2018 | Duan | F16H 9/24 |

\* cited by examiner

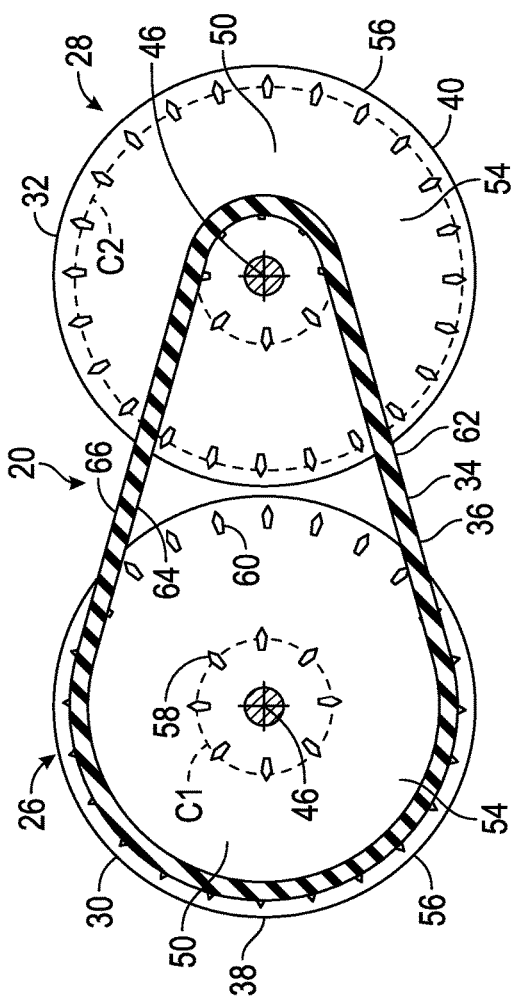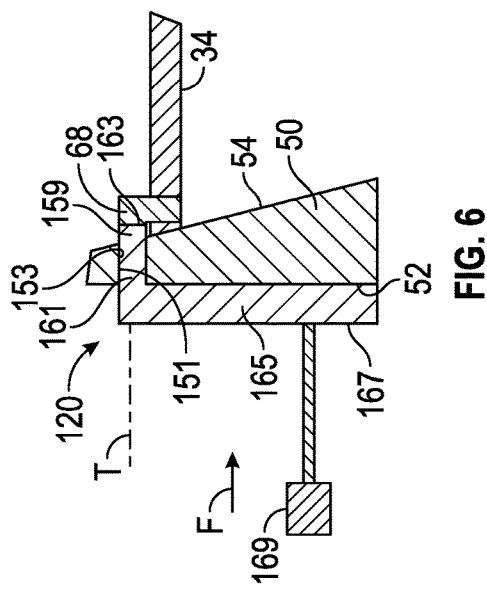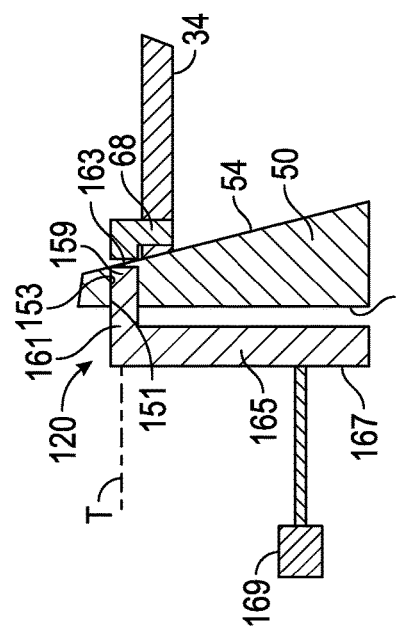

ated by reference.

CONTINUOUSLY VARIABLE TRANSMISSION

CROSS-REFERENCE TO RELATED APPLICATIONS

This is a national stage application of, and claims priority to, International Patent Application No. PCT/CN2014/075492, filed on Apr. 16, 2014, the entire disclosure of which is hereby incorporated by reference.

TECHNICAL FIELD

The present disclosure relates to a continuously variable transmission.

BACKGROUND

In general, a continuously variable transmission (CVT) is a transmission that can change steplessly through an infinite number of effective gear ratios between a maximum gear ratio and a minimum gear ratio. A typical continuously variable transmission includes two pulleys, each having two sheaves. A belt or any suitable endless rotatable device typically runs between the two pulleys, with the two sheaves of each of the pulleys sandwiching the belt therebetween. As used herein, the term "endless rotatable device" means a device, such as a cable or chain, without ends and capable of transferring torque when it rotates. Frictional engagement between the sheaves of each pulley and the belt couples the belt to each of the pulleys to transfer a torque from one pulley to the other. One of the pulleys may function as a drive pulley so that the other pulley can be driven by the drive pulley via the belt. The gear ratio is the ratio of the torque of the driven pulley to the torque of the drive pulley. The gear ratio may be changed by moving the two sheaves of one of the pulleys closer together and the two sheaves of the other pulley farther apart, causing the belt to ride higher or lower on the respective pulley.

SUMMARY

It is useful to minimize the fuel consumption in a vehicle including a CVT. To this end, the CVT should work as efficiently as possible independently of its speed ratio. The presently disclosed CVT can minimize fuel consumption in a vehicle by maximizing its efficiency. Additionally, the presently disclosed CVT can maximize its torque capacity when operated at relatively low speed ratios (e.g., 0:35:1 speed ratio) and can maximize its efficiency when operated at relatively high speed ratios (e.g., 2.65:1 speed ratio). In an embodiment, the CVT includes a first pulley, a second pulley, and an endless rotatable device operatively interconnecting the first and second pulleys. The endless rotatable device includes a device body and a plurality of device teeth protruding from the device body. Each of the first and second pulleys includes a first sheave, a second sheave, and a pulley axle operatively coupled between the first sheave and the second sheave. The pulley axle defines a pulley center. The first sheave is movable relative to the second sheave along the pulley axle. The endless rotatable device is movable toward and away from the pulley center as the first sheave moves away and toward the second sheave. Each of the first and second sheaves includes a sheave body and a plurality of sheave teeth protruding from the sheave body. The sheave teeth are annularly arranged around the pulley center. The sheave teeth are shaped to mate with the device teeth.

The present disclosure also relates to a vehicle including the CVT described above.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a schematic, sectional, front view of the CVT shown in FIG. 2;

FIG. 5 is a schematic, sectional, side view of part of a CVT in accordance with another embodiment of the present disclosure, wherein the CVT includes a teeth support in a first support position; and FIG. 6 is a schematic, sectional, side view of part of the CVT shown in FIG. 5, wherein the teeth support is in a second support position.

DETAILED DESCRIPTION

Figure 1:
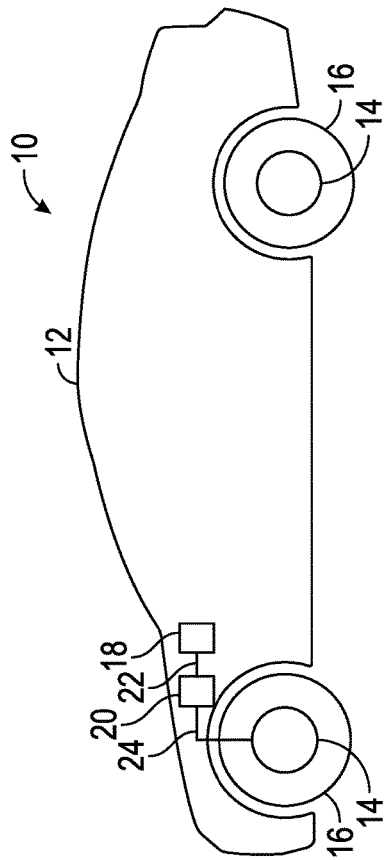
FIG. 1 is a schematic, side view of a vehicle including a CVT in accordance with an embodiment of the present disclosure.

Referring to the drawings, wherein like reference numbers correspond to like or similar components throughout the several figures, FIG. 1 schematically illustrates a vehicle 10 including a vehicle body 12 and a plurality of wheels 14 operatively coupled to the vehicle body 12. Each wheel 14 is coupled to a tire 16. The vehicle 10 may be a car or any other movable platform such as farm equipment and additionally includes an internal combustion engine 18 and a continuously variable transmission (CVT) 20 operatively coupled to the internal combustion engine 18. The internal combustion engine 18 can provide power to the wheels 14 in order to propel the vehicle 10. The CVT 20 can transmit torque from the internal combustion engine 18 to the wheels 14 at different speed ratios. The CVT 20 includes an input transmission member 22, such as a shaft, operatively coupled to the internal combustion engine 18 and an output transmission member 24, such as a shaft, operatively coupled to the wheels 14. In the present disclosure, the "speed ratio of the CVT" refers the ratio of the angular speed of the input transmission member 22 to the angular speed of the output transmission member 24.

Figure 3:
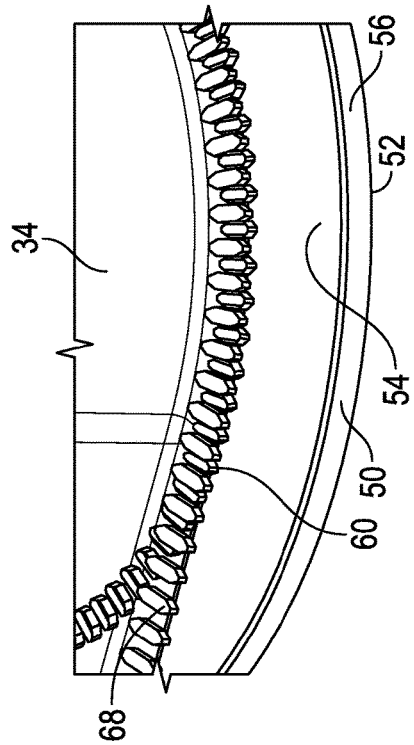
FIG. 3 is a schematic, perspective, enlarged view of part of the CVT shown in FIG. 2.
Figure 2:
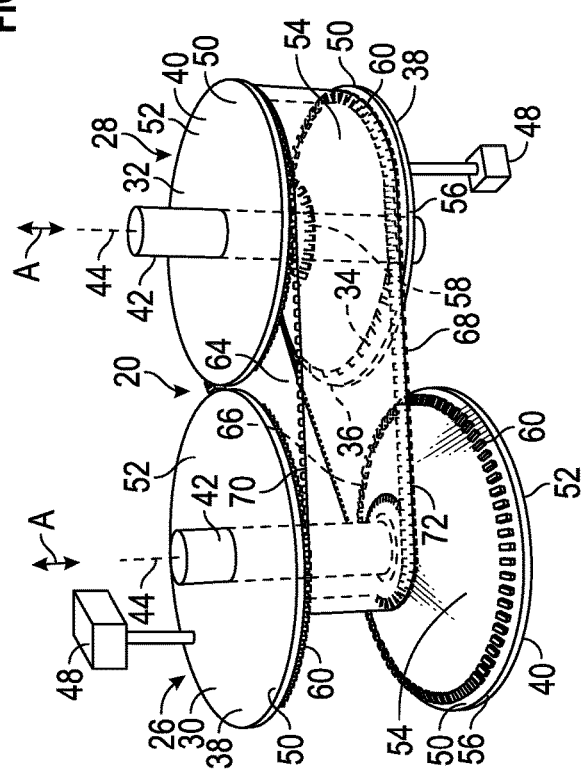
FIG. 2 is a schematic, perspective view of the CVT schematically shown in FIG. 1.

With reference to FIGS. 2-4, the CVT 20 can transmit torque from the internal combustion engine 18 to the wheels 14 and includes a driving member 26 operatively coupled to input transmission member 22 and a driven member 28 operatively coupled to the output transmission member 24. The driving member 26 can receive input torque from the internal combustion engine 18 via the input transmission member 22, and the driven member 28 can transmit output torque to the wheels 14 via the output transmission member 24. The driving member 26 may be configured as a first or input pulley 30, and the driven member 28 may be configured as a second or output pulley 32. The structure and operation of the first pulley 30 and the second pulley 32 may be substantially similar or identical. Accordingly, the first pulley 30 and the second pulley 32 may have the same components. In addition to the first and second pulleys 30, 32, the CVT 20 includes an endless rotatable device 34 capable of transferring torque. As used herein, the term "endless rotatable device" means a device, such as a belt or chain, without ends and capable of transferring torque when it rotates. In the depicted embodiment, the endless rotatable device 34 is a chain 36. The endless rotatable device 34 (e.g. chain 36) rotatably couples the first pulley 30 to the second pulley 32. In other words, the endless rotatable device 34 operatively interconnects the first and second pulleys 30, 32. Because the endless rotatable device 34 is coupled between the first pulley 30 and the second pulley 32, the rotation of the first pulley 30, which is driven by the internal combustion engine 18, causes the second pulley 32 to rotate.

With continued reference to FIGS. 2-4, each of the first pulley 30 and the second pulley 32 includes a first or movable sheave 38, a second or stationary sheave 40, and a pulley axle 42. The pulley axles 42 may be shafts or pins and both extend along respective pulley axes 44. In the depicted embodiment, however, the pulley axle 42 of the first pulley 30 is rotationally coupled to the internal combustion engine 18. Accordingly, the pulley axle 42 of the first pulley 30 can receive input torque from the internal combustion engine 18. Rotating the pulley axle 42 about the pulley axis 44 causes the first pulley 30 and the second pulley 32 to rotate about the pulley axis 44. Each pulley axle 42 defines a respective pulley center 46 (FIG. 4) and is rotationally coupled between the first and second sheaves 38, 42. The pulley axes 44 intersect the respective pulley centers 46. However, the pulley axis 44 of the first pulley 30 is substantially parallel to the pulley axis 44 of the second pulley 32.

The first sheave 38 may also be referred to as the first or movable pulley portion, and the second sheave 40 may also be referred to as the second or stationary pulley portion. The first sheave 38 and the second sheave 40 may have a substantially frusto-conical shape and are both configured to rotate about their respective axles 42. However, the second sheave 40 is fixed to the corresponding pulley axle 42 and, therefore, cannot move along the corresponding pulley axes 44. In other words, the second sheave 40 is configured to remain axially stationary relative to the pulley axis 44 defined by the pulley axle 42. The first sheave 38, on the other hand, can move axially along the pulley axis 44 defined by the pulley axle 42 along the direction indicated by double arrows A. Thus, the first sheave 38 can move toward and away from the second sheave 40.

The CVT 20 further includes one or more sheave actuators 48 operatively coupled to the first pulley 30, the second pulley 32, or both. In the depicted embodiment, one sheave actuator 48 can apply a force to the first sheave 38 of the second pulley 32 to move the first sheave 38 toward or away from the second sheave 40 of the second pulley 32. Another sheave actuator 48 can apply a force to the first sheave 38 of the first pulley 30 to move the first sheave 38 toward or away from the second sheave 40 of the first pulley 30. Alternatively, a plate or any other suitable coupling (not shown) can interconnect the first sheaves 38 of the first pulley 30 and the second pulley 32 so that only one sheave actuator 48 is needed. In such case, the application of the force by the sheave actuator 48 to the first sheave 38 of the first pulley 30 also causes the first sheave 38 of the second pulley 32 to move relative to the pulley axis 44.

Each of the first and second sheaves 38 and 40 has a sheave body 50 having a substantially frusto-conical shape. Each sheave body 50 defines an outer sheave surface 52 and an inner sheave surface 54 opposite the outer sheave surface 52. The outer sheave surface 52 is substantially flat, whereas the inner sheave surface 54 is obliquely angled relative to the outer sheave surface 52 and the pulley axis 44. The sheave body 50 additionally defines an annular lateral surface 56 interconnecting the outer sheave surface 52 and the inner sheave surface 54.

Each of the first and second sheaves 38, 40 further includes a plurality of first sheave teeth 58 and a plurality of second sheave teeth 60. Although the drawings show that each sheave 38, 40 includes the first and second sheave teeth 58, 60, it is contemplated that each sheave 38, 40 may only include the first sheave teeth 58. The first and second sheave teeth 58, 60 protrude from the sheave body 50. Specifically, the first and second sheave teeth 58, 60 protrude from the inner sheave surface 54 in a direction away from the outer sheave surface 52. Accordingly, in this embodiment, the first and second sheave teeth 58, 60 remain stationary relative to the sheave (i.e., the first sheave 38 or the second sheave 40) to which they are attached. The first sheave teeth 58 are spaced apart from the second sheave teeth 60. Moreover, the first and second sheave teeth 58, 60 may be discrete components coupled to the sheave body 50 or may be part of the corresponding sheave 38, 40 that are monolithically formed with the sheave body 50. The first sheave teeth 58 are annularly arranged around the pulley center 46 so as to define a first circumference C1. In other words, the first sheave teeth 58 are arranged around the pulley axle 42. The second sheave teeth 60 are arranged annularly around the pulley center 46 so as to define a second circumference C2. The second circumference C2 is greater than the first circumference C1. Thus, the second sheave teeth 60 may be disposed closer to the annular side surface 56 than the first sheave teeth 58. Although the drawings show, first and second sheaves 38, 40 with two sets of annularly arranged sheave teeth 58, 60, it is envisioned that the first and second sheaves 38, 40 may include more or fewer sets of annularly arranged sheave teeth. As a non-limiting example, the first and second sheave 38, 40 may include only one set of annularly arranged sheave teeth 58 or 60.

The endless rotatable device 34 includes a device body 62 defining a first or inner body surface 64 and a second or outer body surface 66 opposite the first body surface 64. In addition, the endless rotatable device 34 defines a first lateral edge 70 and a second lateral edge 72 both located between the first body surface 64 and the second body surface 66. The endless rotatable device 34 further includes a plurality of device teeth 68 protruding from the device body 62. For clarity purposes, FIG. 4 does not illustrate the device teeth 66. The device teeth 68 protrude from the first body surface 64 in a direction away from the second body surface 64. In the depicted embodiment, the device teeth 68 are disposed along the first and second lateral edges 70, 72 and are fixed to the device body 62. Therefore, the device teeth 68 remain stationary relative to the device body 62. It is envisioned that the device teeth 68 may be discrete components coupled to the device body 62. Alternatively, the device teeth 68 may be monolithically formed with the device body 62. Regardless, the device teeth 68 are configured, shaped, and sized to mate with the first sheave teeth 58 and second sheave teeth 60 so that the rotation of the first or second pulleys 30, 32 causes the rotation of the endless rotatable device 34 or vice-versa. In other words, when the device teeth 68 mate with the first sheave teeth 58 or second sheave teeth 60, rotating the first pulley 30 about its pulley axis 44 causes the endless rotatable device 34 to rotate. In turn, rotating the endless rotatable device 34 causes the second pulley 32 to rotate about its pulley axis 44.

During operation of the CVT 20, the internal combustion engine 18 transmits input torque to the first pulley 30, causing the first pulley 30 to rotate about its center pulley center 46. As the first pulley rotates 30, the inner sheave surface 54 contacts the endless rotatable device 34, and the friction between inner sheave surface 54 and the endless rotatable device 34 causes the endless rotatable device 34 to rotate. Because the endless rotatable device 34 is rotationally coupled to the second pulley 32, rotating the endless rotatable device 34 causes the second pulley 32 to rotate about its pulley axis 44. While the endless rotatable device 34 is rotating, the sheave actuators 48 may apply a force to the first sheaves 38 of the first and second pulley 30, 32 in order to move the first sheaves 38 toward or away from the respective second sheaves 40 in order to vary the speed ratio of the CVT. As the first sheave 38 of the first or second pulley 30, 32 moves toward the second sheave 40, the engagement between the inner sheave surface 54 and the endless rotatable device 34 causes the endless rotatable device 34 to move away from the pulley axis 44 or pulley center 46. Conversely, as the first sheave 38 of the first or second pulley 30, 32 moves away from the second sheave 40, the engagement between the inner sheave surface 54 and the endless rotatable device 34 causes the endless rotatable device 34 to move toward the pulley axis 44 or pulley center 46. In other words, the endless rotatable device 34 is movable toward and away from the pulley center 46 as the first sheave 38 is movable toward and away from the second sheave 40.

While the internal combustion engine 18 drives the first pulley 30, the friction between the inner sheave surfaces 54 of the first pulley 30 drives the endless rotatable device 34. The endless rotatable device 34 then transmits torque from the first pulley 30 to the second pulley 32. Next, the friction between inner sheave surfaces 54 of the second pulley 32 and the endless rotatable device 34 drives the second pulley 32. However, in addition to friction, the positive engagement between the sheave teeth (e.g., first sheave teeth 58 or second sheave teeth 60) and the device teeth 68 may also drive the endless rotatable device 34 and the second pulley 32.

As discussed above, the internal combustion engine 18 drives the first pulley 30. As a result, the first pulley 30 rotates about its pulley axes 44. While the first pulley 30 rotates about its first pulley axis 44, the sheave actuator 48 applies a force to the first sheave 38, thereby moving the first sheave 38 toward or away from the second sheave 40 along the pulley axis 44. Consequently, the endless rotatable device 34 moves toward and away from the pulley axle 42. At some point, the endless rotatable device 34 is close enough to the first sheave teeth 58 such that the device teeth 68 mate with the first sheave teeth 58. When the device teeth 68 mate with the first sheave teeth 58, the positive engagement between the device teeth 68 and the first sheave teeth 58 (rather than the friction between inner sheave surface 54 of the first pulley 30 and the endless rotatable device 34) allows the first pulley 30 to transmit torque to the endless rotatable device 34. The first and second sheave teeth 58, 60 may be annularly arranged around the pulley axles 42 of the first and second pulleys 30, 32 such that the CVT 20 operates at its maximum speed ratio when the device teeth 68 mate with the first sheave teeth 58 of the first pulley 30 and the second sheave teeth 60 of the second pulley 32. Conversely, the first and second sheave teeth 58, 60 may be annularly arranged around the pulley axles 42 such that the CVT 20 operates at its minimum speed ratio when the device teeth 68 mate with the second sheave teeth 60 of the second pulley 32 and the first sheave teeth 58 of the first pulley 30. The operation of the CVT 20 as described above can minimize the fuel consumption of the vehicle 10. In addition, the structure and operation of the CVT 20 as described above maximizes the capacity to transmit torque from the internal combustion engine 18 to the wheels 14 via the CVT 20.

FIGS. 5 and 6 schematically illustrate a CVT 120 in accordance with another embodiment of the present disclosure. The structure and operation of the CVT 120 is substantially similar or identical to the CVT 20 described above, except for the features described below. In the CVT 120, the sheave teeth 159 may correspond to either the first sheave teeth 58 or the second sheave teeth 60 of the CVT 20 described above. In this embodiment, the sheave teeth 159 are movable relative to the sheave body 50 between a first teeth position (FIG. 5) and a second teeth position (FIG. 6). Specifically, each sheave tooth 159 can move through a teeth opening 153 extending through the sheave body 50. Each sheave body 50 defines a plurality of internal sheave surfaces 151. Each internal sheave surface 151 in turn defines one teeth opening 153 configured, shaped, and sized to receive at least one sheave tooth 159. For example, each teeth opening 153 may be configured, shaped, and sized to slidably receive one sheave tooth 159. Each of the first and second sheaves 38, 40 (FIG. 2) may define a plurality of teeth openings 153. Each teeth opening 153 extends through the sheave body 50. Thus, each teeth opening 153 extends through the inner sheave surface 54 and the outer sheave surface 52 along a teeth axis T. The teeth axis T may be substantially perpendicular to the outer sheave surface 52 and obliquely angled relative to the inner sheave surface 54. In other words, each of the first and second sheaves 38, 40 (FIG. 2) defines a plurality of teeth openings 153 extending through the sheave body 50. Each teeth opening 153 is configured, shaped, and sized to receive one of the plurality of sheave teeth 159 such that each sheave tooth 159 is movable relative to the sheave body 50 through one of the teeth openings 153.

Each sheave tooth 159 includes a first teeth end 161 and a second teeth end 163 opposite the first teeth end 161. The CVT 120 further includes a teeth support 165, such as a plate 167, coupled to the sheave teeth 159. The teeth support 165 is movable relative to the sheave body 50 and supports at least some or all of the sheave teeth 159. A support actuator 169 is operatively coupled to the teeth support 165 and can apply a force F to the teeth support 165 in order to move the teeth support 165 relative to the sheave body 50 between a first support position (FIG. 5) and a second support position (FIG. 6). In other words, upon actuation of the support actuator 169, the teeth support 165 can move toward or away from the sheave body 50. In other words, the teeth support 165 can move relative to the sheave body 50 between a first support position (FIG. 5) and a second support position (FIG. 6). The sheave teeth 159 protrude from the teeth support 165 such that the sheave teeth 159 are in the first teeth position (FIG. 5) when the teeth support 165 is in the first support position and the sheave teeth 159 are in the second teeth position (FIG. 6) when the teeth support 165 is in the second support position (FIG. 6).

The first teeth end 161 of each sheave tooth 159 is directly coupled to the teeth support 165 and the second teeth end 163 is free. That is, the second free end 163 of each sheave teeth 159 is only indirectly coupled to the teeth support 165 through the first teeth end 161. When the teeth support 165 is in the first support position (FIG. 5), the sheave teeth 159 are in the first teeth position. In the first teeth position, the sheave teeth 159 are spaced apart from the device teeth 68 and therefore cannot mate with the device teeth 68. Specifically, when the sheave teeth 159 are in the first teeth position, the second teeth end 163 does not extend beyond the inner sheave surface 54 of the sheave body 50. For example, when the sheave teeth 159 are in the first teeth position, the second teeth end 163 is entirely disposed inside the sheave body 50. Specifically, when the sheave teeth 159 are in the first teeth position, each second teeth end 163 is entirely disposed in one of the teeth openings 153.

When the teeth support 165 is in the second support position (FIG. 6), the sheave teeth 159 are in the second teeth position. In the second teeth position, the sheave teeth 159 can mate with the device teeth 68. Specifically, when the sheave teeth 159 are in the second teeth position, the sheave teeth 159 extend beyond the inner sheave surface 54 of the sheave body 50. For example, when the sheave teeth 159 are in the second teeth position, the second teeth end 163 is entirely disposed outside the sheave body 50. Specifically, when the sheave teeth 159 are in the first teeth position, each second teeth end 163 is entirely disposed outside one of the teeth openings 153.

While the best modes for carrying out the invention have been described in detail, those familiar with the art to which this invention relates will recognize various alternative designs and embodiments for practicing the invention within the scope of the appended claims.

The invention claimed is:

1. A continuously variable transmission (CVT), comprising:
   a first pulley;
   a second pulley;
   an endless rotatable device operatively interconnecting the first and second pulleys, the endless rotatable device including a device body and a plurality of device teeth protruding from the device body;
   wherein each of the first and second pulleys includes:
      a first sheave;
      a second sheave;
      a pulley axle operatively coupled between the first sheave and the second sheave, the pulley axle defining a pulley center, the first sheave being movable relative to the second sheave along the pulley axle, and the endless rotatable device being movable toward and away from the pulley center as the first sheave moves away from and toward the second sheave;
      wherein each of the first and second sheaves includes:
         a sheave body;
         a plurality of sheave teeth protruding from the sheave body, the plurality of sheave teeth being annularly arranged around the pulley center, and the sheave teeth being shaped to mate with the device teeth; and
         wherein the plurality of sheave teeth is a plurality of first sheave teeth, and each of the first and second sheaves includes a plurality of second sheave teeth annularly arranged around the pulley center, and the plurality of first sheave teeth is spaced apart from the plurality of second sheave teeth.

2. The CVT of claim 1, wherein the plurality of first sheave teeth is annularly arranged around the pulley center so as to define a first circumference, and the plurality of second sheave teeth is annularly arranged around the pulley center so as to define a second circumference, and the second circumference is greater than the first circumference.

3. The CVT of claim 1, wherein the plurality of sheave teeth are movable relative to the sheave body between a first teeth position and a second teeth position.

4. The CVT of claim 3, wherein the sheave body defines an inner sheave surface, and, in the second teeth position, the plurality of sheave teeth extends beyond the inner sheave surface of the sheave body.

5. The CVT of claim 4, wherein each of the plurality of sheave teeth includes a first teeth end and a second teeth end and, in the first teeth position, the second teeth end of each of the sheave teeth is entirely disposed inside the sheave body.

6. The CVT of claim 5, wherein, in the second teeth position, the second teeth end of each of the sheave teeth is entirely disposed outside the sheave body.

7. The CVT of claim 6, further comprising a teeth support movably relative to the sheave body between a first support position and a second support position, wherein the plurality of sheave teeth protrudes from the teeth support such that the sheave teeth are in the first teeth position when the teeth support is in the first support position, and the sheave teeth are in the second teeth position when the teeth support is in the second support position.

8. The CVT of claim 7, wherein each of the first and second sheaves defines a plurality of teeth openings extending through the sheave body, each teeth opening being sized to receive one of the plurality of sheave teeth such that each sheave tooth is movable relative to the sheave body through one of the teeth openings.

9. A vehicle, comprising:
   an internal combustion engine;
   a plurality of wheels; and
   a continuously variable transmission (CVT) operatively coupled between the internal combustion engine and the wheels, wherein the CVT includes:
      a first pulley;
      a second pulley;
      an endless rotatable device operatively interconnecting the first and second pulleys, the endless rotatable device including a device body and a plurality of device teeth protruding from the device body;
      wherein each of the first and second pulleys includes:
         a first sheave;
         a second sheave;
         a pulley axle operatively coupled between the first sheave and the second sheave, the pulley axle defining a pulley center, the second sheave being movable relative to the first sheave along the pulley axle, and the endless rotatable device being movable toward and away from the pulley center as the second sheave moves away from and toward the first sheave;
         wherein each of the first and second sheaves includes:
            a sheave body;
            a plurality of sheave teeth protruding from the sheave body, the plurality of sheave teeth being annularly arranged around the pulley center, and the sheave teeth being shaped to mate with the device teeth; and
      wherein the plurality of sheave teeth is a plurality of first sheave teeth, and each of the first and second sheaves includes a plurality of second sheave teeth annularly arranged around the pulley center, and the plurality of first sheave teeth is spaced apart from the plurality of second sheave teeth.

10. The vehicle of claim 9, wherein the plurality of first sheave teeth is annularly arranged around the pulley center so as to define a first circumference, and the plurality of second sheave teeth is annularly arranged around the pulley center so as to define a second circumference, and the second circumference is greater than the first circumference.

11. The vehicle of claim 9, wherein the plurality of sheave teeth are movable relative to the sheave body between a first teeth position and a second teeth position.

12. The vehicle of claim 11, wherein the sheave body defines an inner sheave surface, and, in the second teeth position, the plurality of sheave teeth extends beyond the inner sheave surface of the sheave body.

13. The vehicle of claim 12, wherein each of the plurality of sheave teeth includes a first teeth end and a second teeth end and, in the second teeth position, the second teeth end of each sheave teeth is entirely disposed inside the sheave body.

14. The vehicle of claim 13, wherein, in the second teeth position, the second teeth end of each of the sheave teeth is entirely disposed outside the sheave body.

15. The vehicle of claim 14, further comprising a teeth support movably relative to the sheave body between a first support position and a second support position, wherein the plurality of sheave teeth protrudes from the teeth support such that the sheave teeth are in the first teeth position when the teeth support is in the first support position, and the sheave teeth are in the second teeth position when the teeth support is in the second support position.

16. The vehicle of claim 15, wherein each of the first and second sheaves defines a plurality of teeth openings extending through the sheave body, each teeth opening being sized to receive one of the plurality of sheave teeth such that each sheave tooth is movable relative to the sheave body through one of the teeth openings.

* * * * *